Jan. 30, 1940.  H. S. JEANS ET AL  2,188,356
STRESS INDICATING WASHER
Filed Oct. 31, 1938
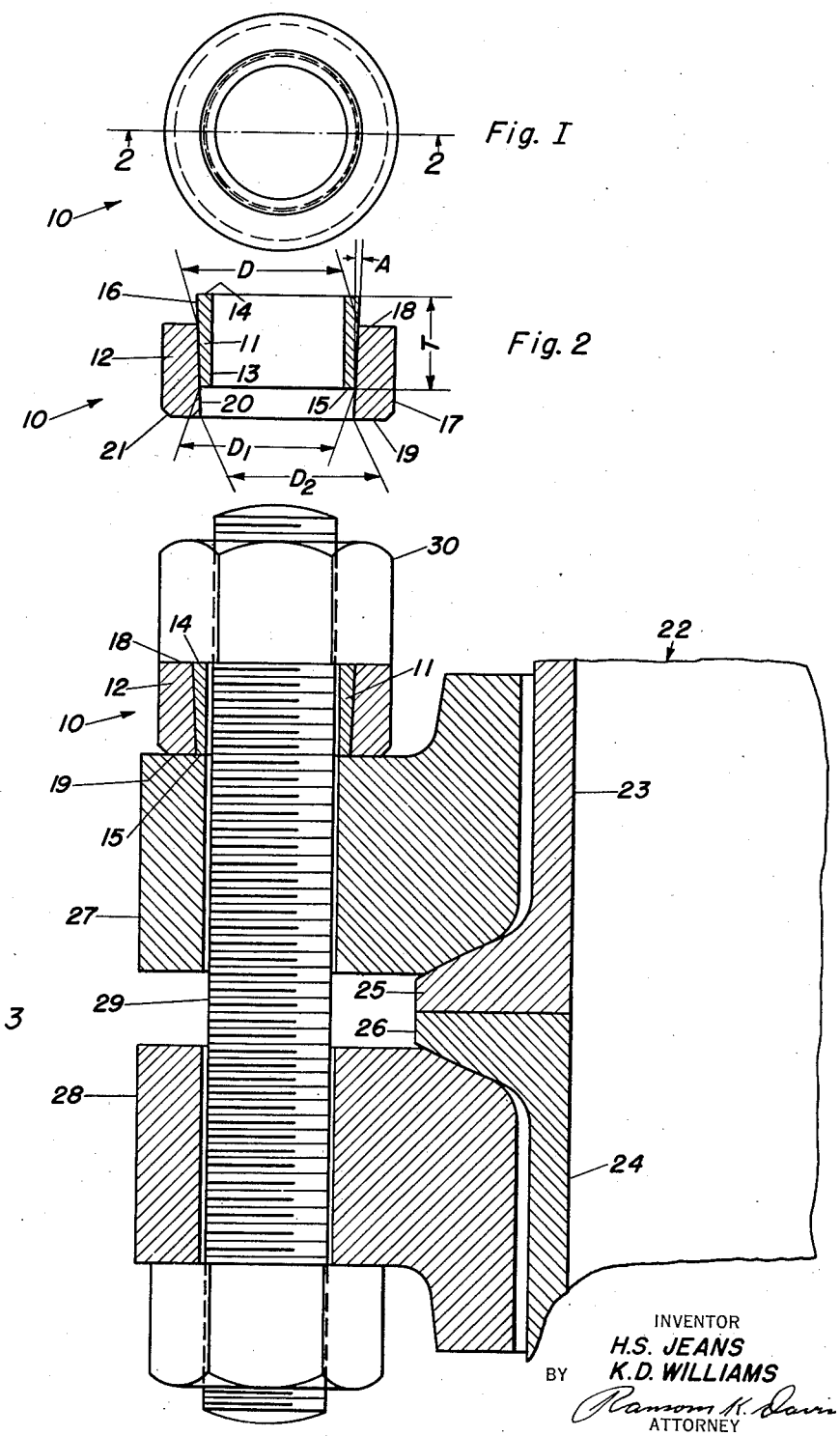
INVENTOR
H.S. JEANS
K.D. WILLIAMS
BY
Ransom K. Davis
ATTORNEY

Patented Jan. 30, 1940

2,188,356

UNITED STATES PATENT OFFICE 2,188,356

STRESS INDICATING WASHER

Howard S. Jeans, United States Navy, and Karl D. Williams, Washington, D. C.

Application October 31, 1938, Serial No. 237,978

4 Claims. (Cl. 265—1)

(Granted under the act of March 3, 1883, as amended April 30, 1928; 370 O. G. 757)

This invention relates to a stress indicating washer, and has for an object to provide a washer for use particularly where high bolt stresses are desirable such as fabricating flanges of high pressure steam piping and where it is necessary or desirable to indicate a limiting stress on a bolt during installation and where it is very desirable that all of the bolts be stressed to the same degree resulting in each bolt having approximately the same holding tension.

A further object of this invention is to provide a stress indicating washer which may indicate a stress of from 10,000 to 45,000 pounds per square inch, a particular washer being made for a particular stress within this range.

The above applies not only to steam line joints but equally well to any joints secured by studs, bolt studs or bolts, where a limiting installation stress on the studs, bolt studs or bolts is required or desired, such as valve bonnets, turbine casings, internal combustion engine covers and pipe joints other than steam. Its use is not necessarily confined to high pressure service; the importance of the prevention of failure of studs, bolt studs or bolts may determine the warrant for using this stress indicating washer.

Although spring washers for nut locking purposes are well known prior to this invention, such as shown in patents to Ehrhardt, 1,640,650; Botscheller, 1,539,348; Emery, 1,303,784; Jokela, 1,283,204; Walton et al., 1,083,471; and Jones, 1,005,227, amongst others, no prior washer is known capable of carrying out the functions of this washer of being able to withstand a high stress, as well as of indicating that the desired stress has been attained.

In making up joints in high pressure, high temperature steam lines it is known that the fastening bolts must exert a holding pressure of between 10,000 and 45,000 pounds per square inch, the particular pressure needed depending upon the particular pressure and temperature in the steam line involved. It is also essential that all the bolts of each flange be tightened so as to exert the same pressure on the flanges, so as to make the joint uniformly tight. Prior to this invention the only satisfactory method of attaining this result was to measure the length of the bolt as the nut is being tightened. From the characteristics of the metal of the bolt it may be determined experimentally just how much the bolt must be stretched in the tightening process in order to attain a particular stress. All the bolts must then be tightened and measured and re-measured with calipers until they have all uniformly stretched the exact desired amount to exert a uniform and desired pressure on the clamping means, naturally, a very tedious, difficult job, especially under the conditions of service which must be performed, as when the steam lines are located close to bulkheads or overheads and not conveniently accessible to the joint maker.

This invention improves over such method in enabling the joint maker to quickly and accurately make up the joints, tightening all of the bolts to the predetermined pressure by merely tightening the nut until the inner male ring of the washer has been driven into the female outer ring, which he can determine quickly and easily, both visually and by the feel of his tightening tool.

With the foregoing and other objects in view, the invention consists in the construction, combination and arrangement of parts hereinafter described and illustrated in the drawing, in which, Fig. 1 is a plan view of the washer of this invention.

Fig. 2 is a sectional view on line 2—2 of Fig. 1; and,

Fig. 3 is a sectional view of a steam line joint showing the washer of this invention applied thereto.

There is shown at 10 the washer of this invention consisting of an inner ring 11 and an outer ring 12. The inner ring 11 will generally have an inner cylindrical surface 13, upper and lower parallel end surfaces 14 and 15 in planes at right angles to the axis of the ring and an outer tapered or cone surface 16. The taper of this cone surface 16 may be anywhere from one to fifteen degrees, dependent upon the particular stress and conditions of service for which the washer 10 is intended. Generally, it has been found that the angle of the taper should be about two degrees. The outer ring 12 will preferably have an outer cylindrical surface 17, upper and lower parallel plane end surfaces 18 and 19 at right angles to the axis of the washer, and an inner tapered surface 20 in the form of a truncated cone, the angle of which will be complementary to the angle of the tapered surface 16 of the inner ring. If desired, the outer edge of the ring 12 may be beveled as at 21. The depth of the two rings of the washer is shown as identical, that is, the distance T between end surfaces 14 and 15 of the inner ring 11 is identical with the distance between the end surfaces 18 and 19 of the outer ring 12.

The material of either part of the washer must have physical characteristics—modulus of elasticity, elastic limit, proof stress, elongation— within limits that are suitable and practicable to obtain the designed stress indication without rupture or undesigned deformation. Carbon steel or steel alloys are preferred for this application. The tapered surfaces must be smooth so as to reduce friction.

It will be observed from Fig. 2 that the diameter $D_1$ of the inner ring at its lower end is greater than the diameter $D_2$ of the inner surface of the outer ring 12 at its lower end, and likewise that the diameter $D_1$ is less than the diameter $D$, which is the diameter of the inner surface of the outer ring at its upper end.

The angle A, which is the angle between the tapered surfaces and the axis of the washer, is extremely small, preferably about two degrees. The angle A of the washer is identical for the outer surface of the inner ring and the inner surface of the outer ring. The difference in the diameters $D_1$ and $D_2$ determines how far the inner ring 11 may be placed into the outer ring 12 before pressure is applied, and will preferably be in the proportion shown in Fig. 2. The distance between the ends of the inner ring should never be more than the distance between the ends of the outer ring. It may be identical but should preferably be less to allow for tolerance. Obviously, it may even be substantially less, if desired.

As one specific example of a washer which carries out this invention for use on a one inch bolt, the washer illustrated in the drawing was made of tool steel in accordance with Navy Department Specification 46S9a, class 3, of November 2, 1931, with the tapered surfaces hard, smooth and polished. The angle A of the taper is two degrees. The diameter D is 1.284 inches, diameter $D_1$ is 1.250 inches, T equals 0.750 inch, the inside diameter of the inner ring 11 equals 1.0625 inches, and the outside diameter of the outside ring 12 equals 1.875 inches. It has been accurately determined that 21,000 pounds per square inch is exerted on the bolt when the nut 30 has been tightened to make contact with the female or outer ring 12. The dimensions set forth may be varied so as to provide any desired predetermined pressure, according to the conditions of service.

In operation, the washer 10 is intended for use in connection with a high pressure, high temperature steam line such as shown at 22 consisting of adjoining pipes 23 and 24 having flanged edges 25 and 26 held together by clamping rings 27 and 28 and a bolt 29 secured in position by a nut 30, the washer 10 being placed between the nut 30 and the clamping ring 27. When the washer 10 is put in position as the joint is being assembled the rings 11 and 12 will be in the relative position shown in Fig. 2, for in this position the rings may be readily separated and do not exert any stress on each other. The nut 30 is then tightened, forcing the inner ring 11 within the outer ring 12 until the end surfaces 14 and 15 of the inner ring reach the planes of the end surfaces 18 and 19 of the outer ring. This will be discernible to the eye of the party making the joint, as well as to his hand by the feel of the tool with which he is working. At this position the bolt will be under the desired stress and by repeating this operation on the remaining bolt studs and nuts a uniform stress will have been applied throughout the periphery of the joint. This invention is to be used with stud bolts, bolts and nuts, bolt studs, etc., all included in the term "bolts" where such bolts are used in assembling parts, whether steam pipe flanges or any other parts which must be assembled together preferably under a predetermined stress.

With the small angle of the surfaces 16 and 20 already indicated, the washer will remain in the tight position while the steam line has the usual high pressure and high temperature therein. If the steam line cools, the inner ring 11 will tend to force itself out of the outer ring 12, thus taking up any slack resulting from the lowering of the temperature or pressure and keeping the joint tight, and when the pressure and temperature are restored the inner ring will be forced back to the position shown in Fig. 3, whereby the joint will remain tight at all times, whether under this pressure or not. Any appreciable separation of the inner and outer rings during service would thus be readily discernible to the eye and indicate that the pressure in the joint is less than usual, for some reason or other.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A stress indicating washer for use with bolts in assembling parts, said washer including an inner solid ring and an outer solid ring of hard, elastic metal, said inner ring and outer ring having contacting tapered straight surfaces of substantially identical but small angle, said inner ring having a minimum external diameter greater than the minimum internal diameter of said outer ring, whereby said rings when telescoped together a predetermined distance indicate that the bolt is stressed a predetermined amount.

2. A stress indicating washer for use with bolts in assembling parts, said washer including an inner solid ring and an outer solid ring of hard, elastic metal, said inner ring and outer ring having contacting tapered straight surfaces of substantially identical but small angle between one and fifteen degrees, said inner ring having a minimum external diameter greater than the minimum internal diameter of said outer ring, whereby said rings when telescoped together a predetermined distance indicate that the bolt is stressed a predetermined amount.

3. A stress indicating washer for use with bolts in assembling parts, said washer including an inner solid ring and an outer solid ring of hard, elastic metal, said inner ring and outer ring having contacting tapered straight surfaces of substantially identical but small angle of about two degrees, said inner ring having a minimum external diameter greater than the minimum internal diameter of said outer ring, whereby said rings when telescoped together a predetermined distance indicate that the bolt is stressed a predetermined amount.

4. A stress indicating washer for use with bolts in assembling parts, said washer including an inner solid ring and an outer solid ring of hard, elastic metal, said inner ring and outer ring having contacting tapered straight surfaces of substantially identical but small angle, said inner ring having a minimum external diameter greater than the minimum internal diameter of said outer ring, the distance between the upper and lower ends of said inner ring being not greater than the distance between the upper and lower ends of said outer ring, whereby said rings when telescoped together a predetermined distance indicate that the bolt is stressed a predetermined amount.

HOWARD S. JEANS.
KARL D. WILLIAMS.